(12) United States Patent
Ohta (10) Patent No.: US 6,774,341 B2
(45) Date of Patent: Aug. 10, 2004

(54) METHOD OF SEVERING AN OPTICAL FIBER USING A LASER BEAM

(75) Inventor: Kazuyoshi Ohta, Yokohama (JP)

(73) Assignee: Moritex Corporation, Tokyo (JP)

( * ) Notice: Subject to any disclaimer, the term of this patent is extended or adjusted under 35 U.S.C. 154(b) by 0 days.

(21) Appl. No.: 10/630,859

(22) Filed: Jul. 31, 2003

(65) Prior Publication Data

US 2004/0020906 A1 Feb. 5, 2004

(30) Foreign Application Priority Data

Jul. 31, 2002 (JP) ........................................ 2002-223986

(51) Int. Cl.[7] .......................... B23K 26/38; B23K 26/06
(52) U.S. Cl. .............................. 219/121.72; 219/121.73
(58) Field of Search ...................... 219/121.72, 121.73, 219/121.75; 385/31

(56) References Cited

U.S. PATENT DOCUMENTS 6,246,026 B1 * 6/2001 Vergeest ................ 219/121.72

FOREIGN PATENT DOCUMENTS

| JP | 4-178286 A | * | 6/1992 |
| JP | 11-77354 A | * | 3/1999 |
| WO | WO-02/034452 A1 | * | 5/2002 |

* cited by examiner

Primary Examiner—Geoffrey S. Evans
(74) Attorney, Agent, or Firm—Townsend & Banta (57) ABSTRACT

A method of severing an optical fiber using a laser beam, in which a laser beam emitted from a laser beam source is applied through a square light transmitting section and a lens to an optical fiber, to form a square light spot on the irradiated portion, for melting, evaporating and severing the optical fiber at said irradiated portion, comprising the step of fixing the portion to be severed at, of the optical fiber, in a cylindrical capillary formed to be flat on the side to be irradiated with the laser beam.

4 Claims, 7 Drawing Sheets

METHOD OF SEVERING AN OPTICAL FIBER USING A LASER BEAM

BACKGROUND OF THE INVENTION

1. Field of the Invention

The present invention relates to a method of severing an optical fiber using a laser beam.

2. Description of the Prior Art

Optical fibers, for example, optical fibers mainly composed of quartz glass are used in optical transmission systems and other optical systems, and the tip forms of these optical fibers play an important role irrespective of kinds of fibers such as single mode fibers and multi-mode fibers.

It is desired that the end faces of an optical fiber have an especially smooth surface and an accurate form for minimizing the connection loss in its connection with another optical fiber or an active optical device. Therefore, it is desired that the method of processing the tip of an optical fiber can achieve accurate machining into a predetermined form at high productivity.

Known methods of finely processing the tip of an optical fiber include various mechanical methods such as fiber cleaving and optical methods such as the use of a $CO_2$ laser, etc.

U.S. Pat. No. 6,246,026 and EP 0,987,570 disclose methods of severing an optical fiber using a pulse $CO_2$ laser. In these methods, a circular beam is merly condensed by a lens for severing an optical fiber.

In these methods, the spatial distribution of light intensities, i.e., profile of the light condensed by a lens becomes conical with the forcus as the vertex, machining becomes difficult with the increase in the depth of the machined portion of the optical fiber. Furthermore, there is such a problem that since a thin V-shaped end face is formed in the section of the machined portion, the gas, fume and heat generated during machining are likely to be retained there, to contaminate or curve the machined surface.

The inventors previously proposed a method and device for processing a work, in which the work is irradiated with a laser beam, to be molten and evaporated by means of the irradiation spot formed at the irradiated portion, particularly a laser processing method and device capable of processing the tip portion of an optical fiber, as an example of the work, into a desired shape. This processing includes the severing intended in the present invention. For example, see the specification and drawings of U.S. patent application Ser. No.: 10/141,911.

Figure 1:
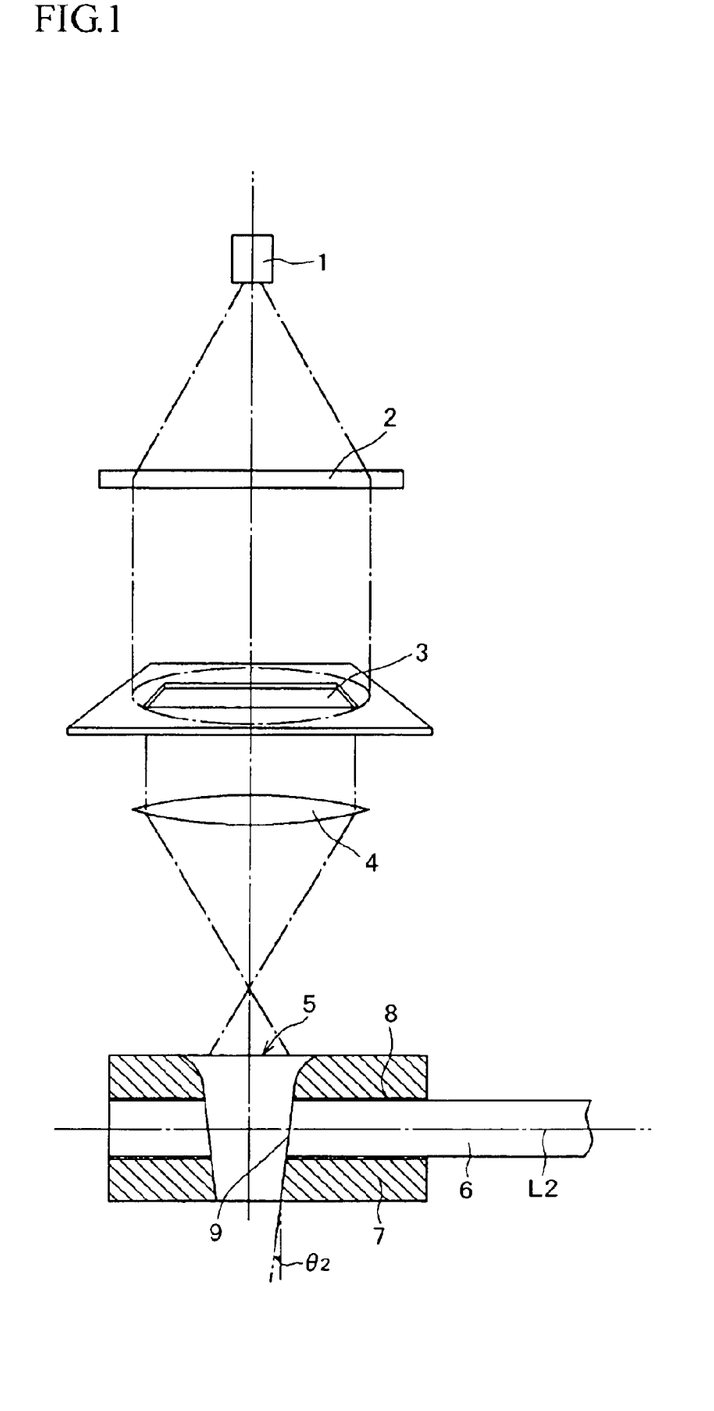
FIG. 1 is a typical view showing the constitution of a device for severing an optical fiber using a laser beam, for carrying out the method of this invention.
Figure 2:
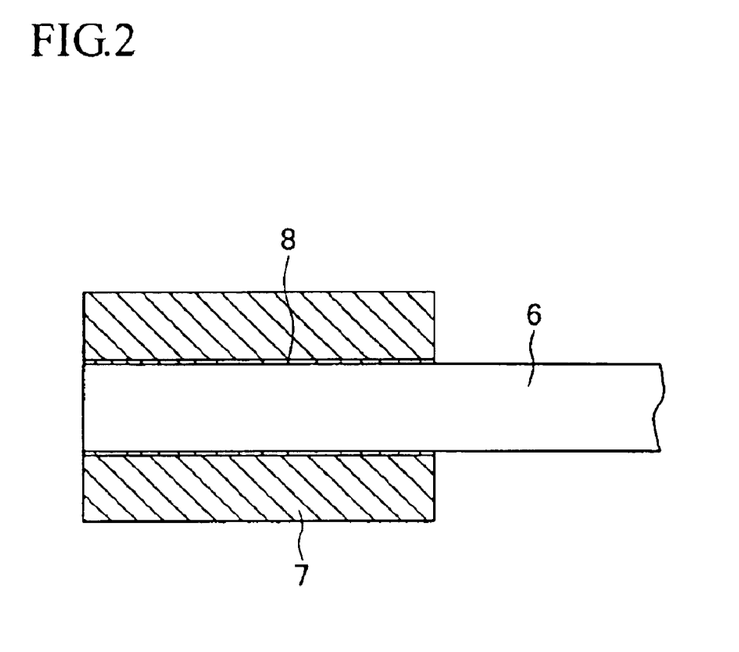
FIG. 2 is a longitudinal sectional view showing how an optical fiber is fixed in a conventional cylindrical capillary.
Figure 3:
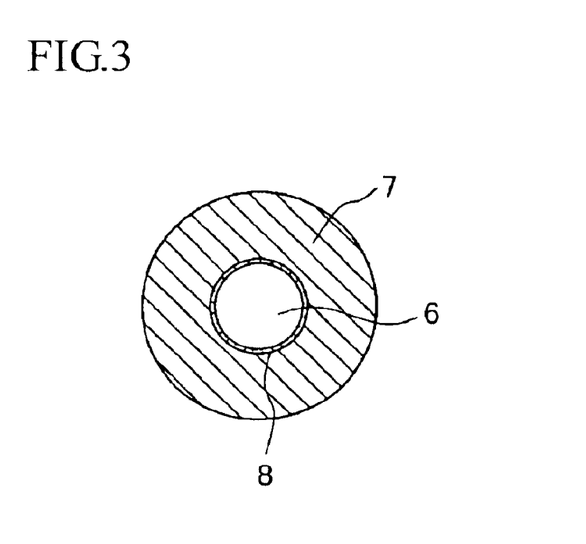
FIG. 3 is a cross sectional view showing how an optical fiber is fixed in a conventional cylindrical capillary.

The aforesaid application proposes, as shown in FIGS. 1 to 3, a constitution, in which a laser beam (indicated by a one-dot-dash line) emitted from a laser beam source 1 is applied through a magnifying collimator lens 2, a square light transmitting section 3 and a lens 4 to an optical fiber 6, to form a square light spot 5 on the optical fiber, for melting, evaporating and severing the optical fiber 6 at the irradiated portion, comprising the step of fixing the portion to be severed at, of the optical fiber 6, in a cylindrical capillary 7 made of quartz glass, plastic material or the like.

For fixing the optical fiber 6 in the cylindrical capillary 7, an adequate adhesive 8 is used. For example, for use as a module that requires severe temperature characteristics, an epoxy based adhesive or the like is used.

If the optical fiber 6 is processed while being fixed in the cylindrical capillary 7 as described above, it is possible to prevent the vibration of the optical fiber 6 caused by the aberration occurring at the time of laser beam irradiation, which is a cause of lowering the shape accuracy at the severed end face. In addition, facial sagging can also be prevented.

The end face 9 of the optical fiber 6 severed by the above-mentioned method inclines, as shown in FIG. 1, at angle $\theta_2$ in reference to the face perpendicular to the axial direction of the optical fiber 6, and the angle $\theta_2$ can be adjusted by adjusting the angle at which the optical fiber 6 is supported for severing, i.e., the angle of elevation.

OBJECTS OF THE INVENTION

Figure 4:
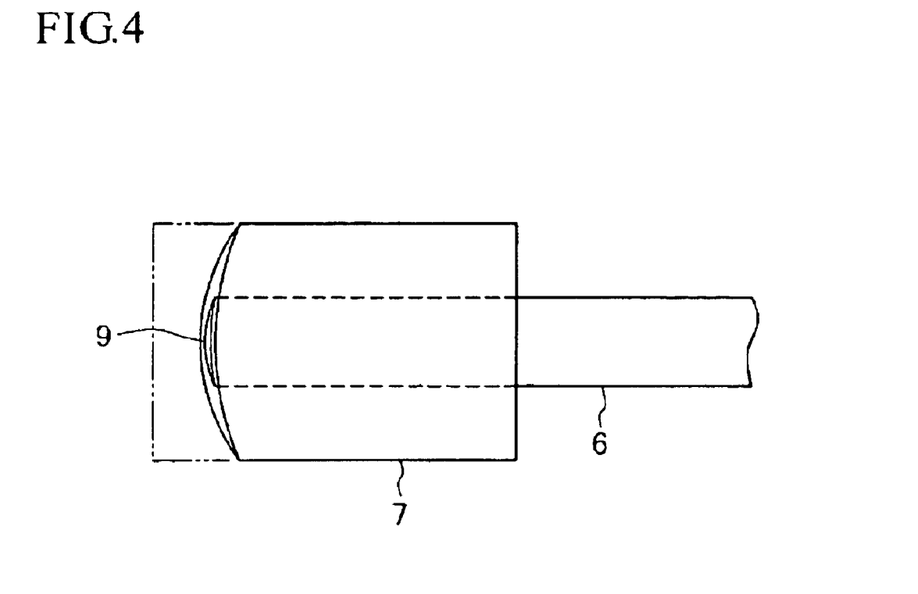
FIG. 4 is a plan view showing how an end face of an optical fiber is severed by the conventional constitution shown in FIGS. 2 and 3.
Figure 5:
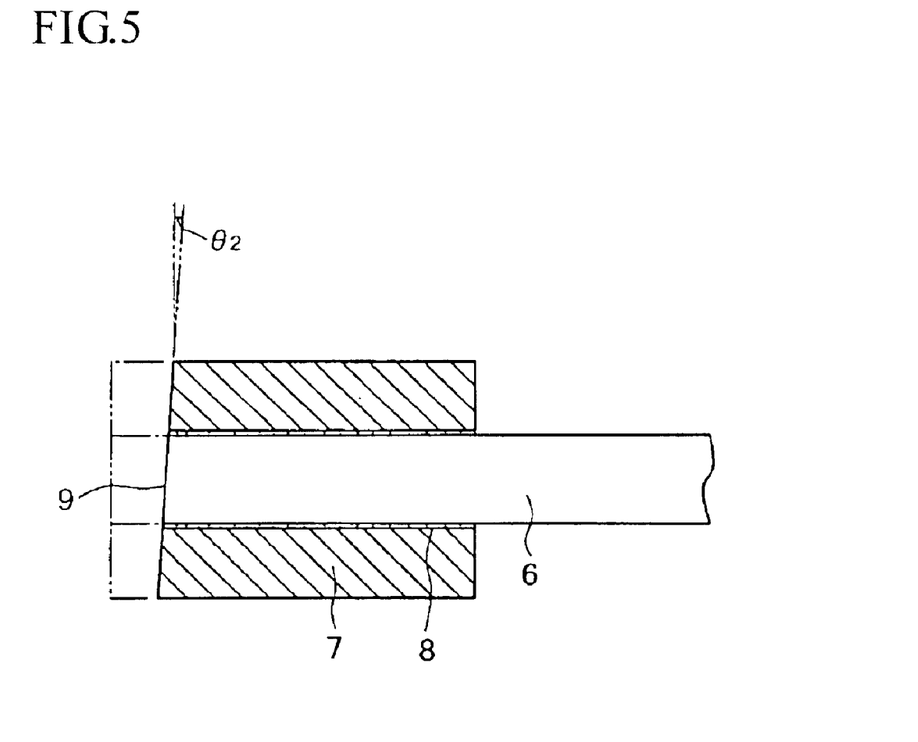
FIG. 5 is a longitudinal sectional view showing how an end face of an optical fiber is severed by the conventional constitution shown in FIGS. 2 and 3.

The inventors tested the above-mentioned method of severing an optical fiber using a laser beam under various conditions, and as a result, found that the severed end face 9 of the cylindrical capillary 7 and the optical fiber 6 inclines at said angle $\theta_2$, and in addition, that the severed end face 9 is curved to be convex at the central region in the direction perpendicular to the inclination direction, as shown in FIG. 4, a plan view from the laser beam irradiation side. The height of the curve was about 1.4 μm, for example, in the case where the cylindrical capillary used was made of quartz glass and had an outer diameter of 0.8 mm.

A first object of this invention is to prevent the formation of the curve.

On the other hand, from the results of the above-mentioned tests, the inventors found that the angle $\theta_2$ of the severed end face of the optical fiber depends on the laser beam irradiation condition such as the magnitude of irradiation energy or duty ratio in pulse irradiation, that there is a clear corresponding relation between the angle formed between the laser beam irradiation direction and a plane perpendicular to the axial direction of the optical fiber and the angle formed between the severed end face of the optical fiber and said plane, i.e., said angle $\theta_2$, under each identical irradiation condition, and that the plotting based on the corresponding relation can be virtually represented by a straight line.

A second object of this invention is to use the corresponding relation for setting the angel $\theta_2$ of the severed end face of the optical fiber at a desired value.

SUMMARY OF THE INVENTION

To solve the above-mentioned problems, the subject matter of claim 1 proposes a method of severing an optical fiber using a laser beam, in which a laser beam emitted from a laser beam source is applied through a square light transmitting section and a lens to an optical fiber, to form a square light spot on the irradiated portion, for melting, evaporating and severing the optical fiber at said irradiated portion, comprising the step of fixing the portion to be severed at, of the optical fiber, in a cylindrical capillary formed to be flat on the side to be irradiated with the laser beam.

The subject matter of claim 2 proposes a method of severing an optical fiber using a laser beam, in which a laser beam emitted from a laser beam source is applied through a square light transmitting section and a lens to an optical fiber, to form a square light spot on the irradiated portion, for melting, evaporating and severing the optical fiber at said irradiated portion, comprising the steps of obtaining beforehand and storing the corresponding relation between the first angle formed between the laser beam irradiation direction and a plane perpendicular to the axial direction of the optical fiber and the second angle formed between the served end face of the optical fiber and said plane, with a laser beam irradiation condition as a parameter; obtaining the first angle for a desired second angle based on said corresponding relation at a desired laser beam irradiation condition; supporting the optical fiber in such a manner as to achieve the obtained first angle; and carrying out said severing.

In the subject matter of claim 2, cases of the corresponding relation under respective laser beam irradiation conditions can be stored as a functional formula, or as a table, for using the corresponding relation.

The convex at the central region on the severed end face of the cylindrical capillary and the optical fiber corresponds to the cylindrical form of the cylindrical capillary on the laser beam irradiation side. So, if the cylindrical capillary is formed to be flat on the laser beam irradiation side as described above, it can be prevented that the central region of the severed end face of the cylindrical capillary and the optical fiber becomes convex.

On the other hand, in the subject matter of claim 2, with a laser beam irradiation condition as a parameter, the corresponding relation between the first angle formed between the laser beam irradiation direction and a plane perpendicular to the axial direction of the optical fiber and the second angle formed between the severed end face of the optical fiber and said plane is obtained beforehand and stored, and the first angle for a desired second angle is obtained based on said corresponding relation at a desired laser beam irradiation condition. Subsequently, the optical fiber is supported in such a manner as to achieve the first angle, and severed. Thus, the inclination angle of the severed end face of the optical fiber can be adequately adjusted.

The subject matters of claims 1 and 2 can be applied simultaneously. In this case, the severed end face of the optical fiber not convex at the central region can be obtained at an adequate inclination angle.

DETAILED DESCRIPTION OF THE PREFERRED EMBODIMENTS

Preferred embodiments for carrying out this invention are described below in reference to attached drawings.

Figure 6:
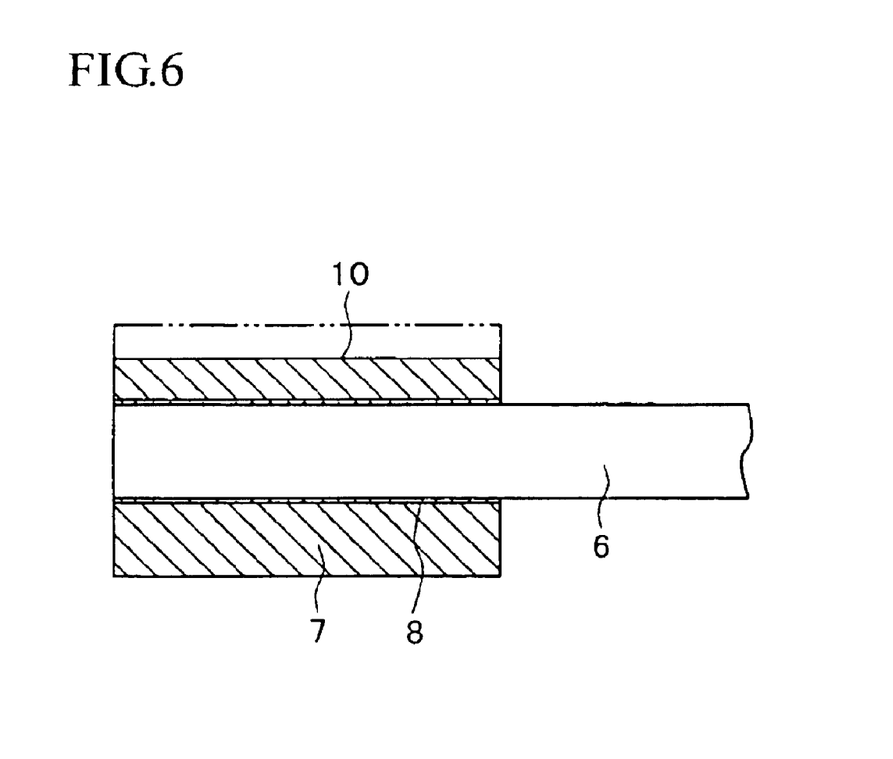
FIG. 6 is a longitudinal sectional view showing how an optical fiber is fixed in the cylindrical capillary of this invention.
Figure 7:
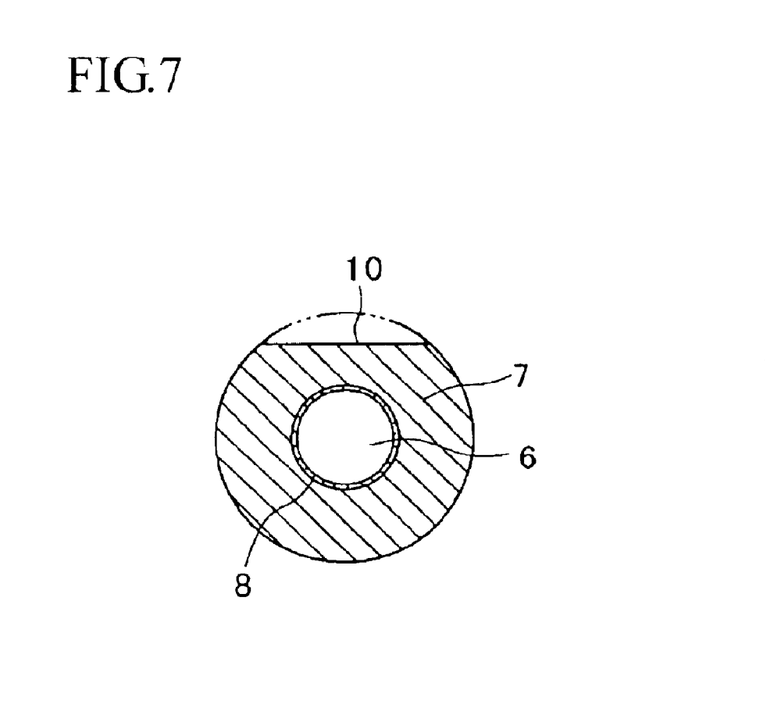
FIG. 7 is a cross sectional view showing how an optical fiber is fixed in the cylindrical capillary of this invention.

FIGS. 6 through 9 show a mode for carrying out the subject matter of claim 1. The same components as in FIGS. 1 through 5 are given the same symbols. FIGS. 6 and 7 are respectively a longitudinal sectional illustration and a cross sectional illustration. In both the drawings, a laser beam is applied from top toward bottom. As shown in these drawings, a cylindrical capillary 7 having an optical fiber 6 fixed in it is formed to be flat (flat portion 10) at the upper portion on the laser beam irradiation side. The flat portion can be formed by a method of polishing, grinding or the like. The flat portion 10 can be either planar or curved.

Figure 8:
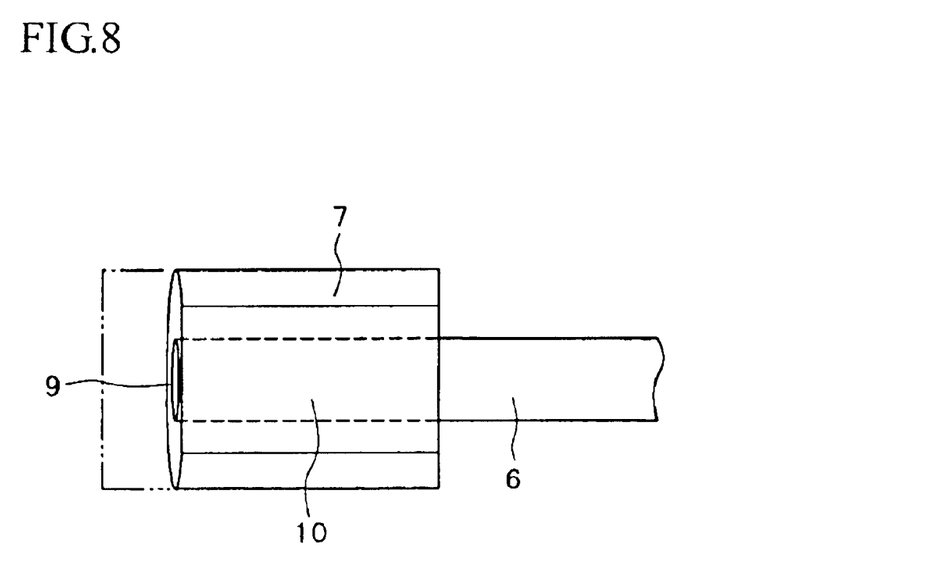
FIG. 8 is a plan view showing how an end face of an optical fiber is severed by the constitution shown in FIGS. 1, 6 and 7.
Figure 9:
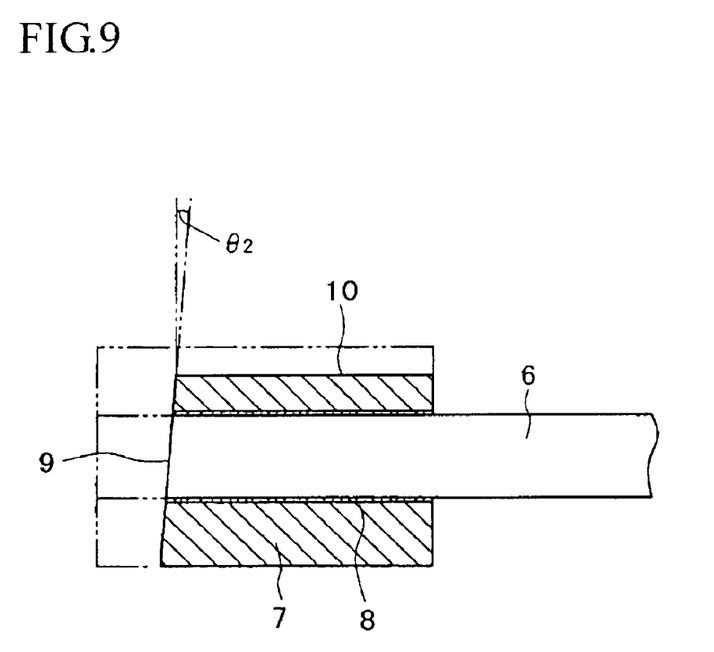
FIG. 9 is a longitudinal sectional view showing how an end face of an optical fiber is severed by the constitution shown in FIGS. 1, 6 and 7.

In this constitution, as in the conventional method, as shown in FIG. 1, a laser beam emitted from a laser beam source 1 is applied through a square light transmitting section 3 and a lens 4 over the cylindrical capillary 7 having the flat portion 10 on the upper side, to form a square light spot 5 that melts, evaporates and severs the optical fiber 6 at the irradiated portion. As a result, the severed end face 9 of the cylindrical capillary 7 and the optical fiber 6 is inclined at angle $\theta_2$ as shown in FIG. 9, while it is inhibited that the central region in the direction perpendicular to the inclination direction becomes convex as shown in FIG. 8.

Figure 10:
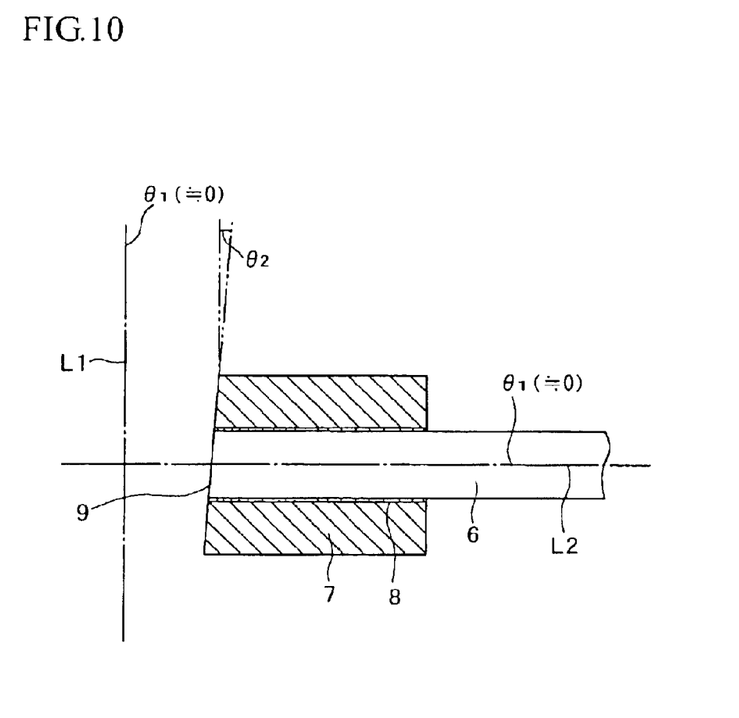
FIG. 10 is a longitudinal sectional view showing how a laser beam applied from above a cylindrical capillary having an optical fiber fixed in it severs the optical fiber by the constitution shown in FIG. 1.
Figure 11:
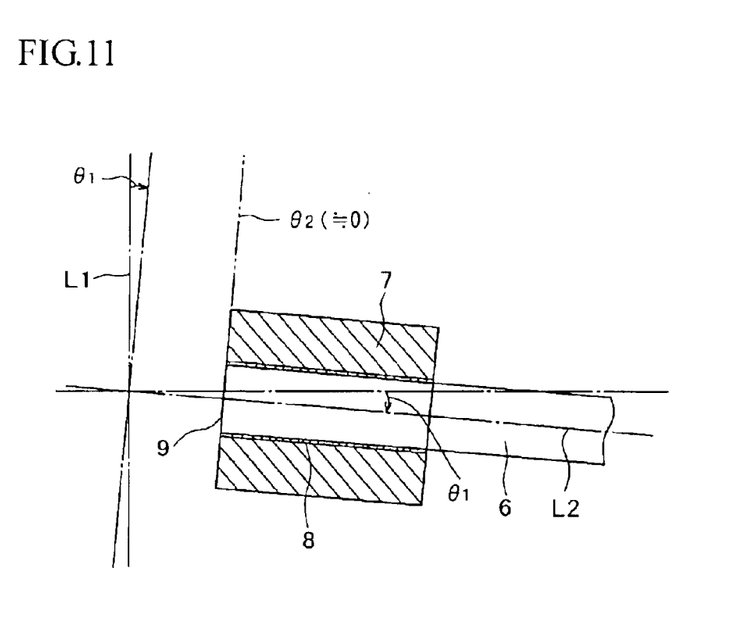
FIG. 11 is another longitudinal sectional view showing how a laser beam applied from above a cylindrical capillary having an optical fiber fixed in it severs the optical fiber by the constitution shown in FIG. 1.
Figure 12:
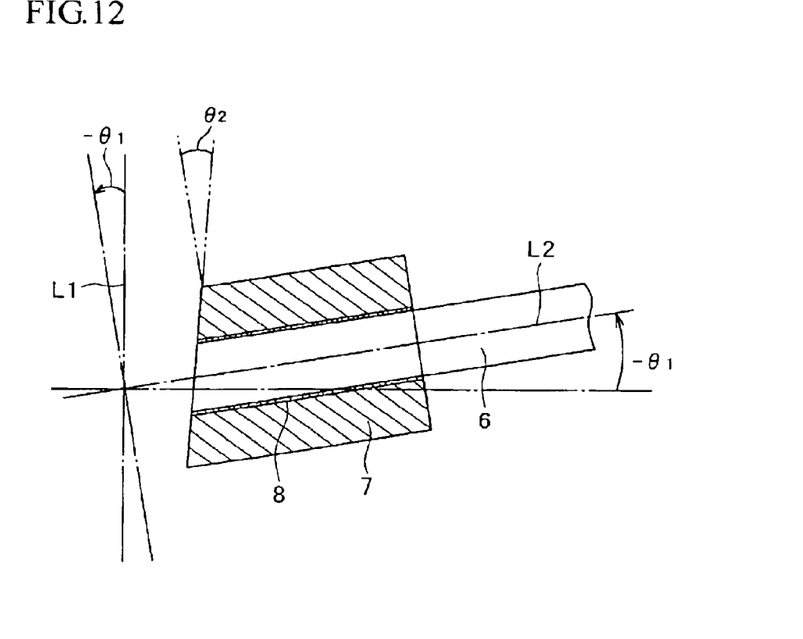
FIG. 12 is a further other longitudinal sectional view showing how a laser beam applied from above a cylindrical capillary having an optical fiber fixed in it severs the optical fiber by the constitution shown in FIG. 1.

FIGS. 10 through 12 show states where the constitution shown in FIG. 1 is used for applying a laser beam from above the cylindrical capillary 7 having the optical fiber 6 fixed in it, for severing. A one-dot-dash line $L_1$ indicates the laser beam irradiation direction, and a one-dot-dash line $L_2$ indicates the axial direction of the optical fiber 6.

In FIG. 10, when severed, the optical fiber 6 is supported in such a manner as to achieve 0 degree as the first angle $\theta_1$ formed between the laser beam irradiation direction $L_1$ and a plane perpendicular to the axial direction $L_2$ of the optical fiber 6. This state can also be expressed such that the optical fiber 6 is supported in such a manner as to keep the axial direction $L_2$ of the optical fiber 6 perpendicular to the laser beam irradiation direction $L_1$. This applies also to the arrangements described below.

In FIG. 11, when severed, the optical fiber 6 is supported in such a manner that the first angle $\theta_1$ formed between the laser beam irradiation direction $L_1$ and a plane perpendicular to the axial direction $L_2$ of the optical fiber 6 becomes a positive value. The clockwise rotating direction of the first angle $\theta_1$ is the positive direction, and the counterclockwise rotating direction, the negative direction.

In FIG. 12, when severed, the optical fiber 6 is supported in such a manner that the first angle $\theta_1$ formed between the laser beam irradiation direction $L_1$ and a plane perpendicular to the axial direction $L_2$ of the optical fiber 6 becomes a negative value.

As can be seen from these drawings, in the case where the optical fiber 6, when severed, is supported in such a manner that the first angle $\theta_1$ formed between the laser beam irradiation direction $L_1$ and a plane perpendicular to the axial direction $L_2$ of the optical fiber 6 becomes 0, said second angle $\theta_2$, i.e., the angle formed between a plane perpendicular to the axial direction $L_2$ of the optical fiber 6 and the severed end face of the optical fiber becomes a certain positive value. If the optical fiber 6, when severed, is supported in such a manner that the first angle $\theta_1$ becomes a certain positive value, the second angle $\theta_2$ becomes almost 0. Moreover, in the case where the optical fiber 6, when severed, is supported in such a manner that the first angle $\theta_1$ becomes a certain negative value as shown in FIG. 12, the second angle $\theta_2$ becomes further larger in the positive direction than that of FIG. 10.

Figure 13:
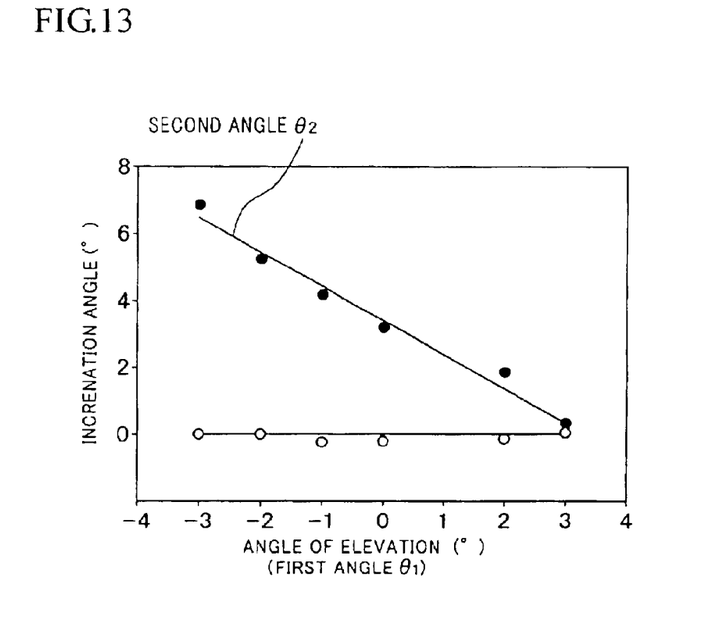
FIG. 13 shows the results of measuring the first angle $\theta_1$ and the second angle $\theta_2$ under a certain laser beam irradiation condition.

FIG. 13 shows the results of the first angle $\theta_1$ and the second angle $\theta_2$ measured under a certain laser beam irradiation condition. In the diagram, closed circles correspond to the second angle $\theta_2$. From the results, it can be seen that the first angle $\theta_1$ and the second angle $\theta_2$ have a virtually straight-line corresponding relation between them. Therefore, the inclination angle of the severed end face 9 of the optical fiber 6, i.e., the second angle $\theta_2$ can be adequately adjusted by a method comprising the steps of obtaining beforehand and storing the corresponding relation between the first angle $\theta_1$ and the second angle $\theta_2$ with a laser beam irradiation condition as a parameter, obtaining the first angle $\theta_1$ for a desired second angle $\theta_2$ based on the stored corresponding relation at a desired laser beam irradiation condition, supporting the optical fiber 6 in such a manner as to achieve the obtained first angle $\theta_1$, and carrying out said severing.

In FIG. 13, open circles show the inclination angles in the direction perpendicular to the inclination direction of the second angle $\theta_2$. These angles are almost 0 degree, being constant irrespective of the first angle $\theta_1$.

INDUSTRIAL APPLICABILITY

This invention as described above exhibits the following effects.

a. In the case where an optical fiber fixed in a cylindrical capillary is severed, the severed end face of the optical fiber inclines at an angle, and a convex is formed at the central region in the direction perpendicular to the inclination angle. This invention can prevent the formation of the convex.

b. The inclination angle of the severed end face of the optical fiber can be adjusted adequately.

What is claimed is:

1. A method of severing an optical fiber using a laser beam, in which a laser beam emitted from a laser beam source is applied through a square light transmitting section and a lens to an optical fiber, to form a square light spot on the irradiated portion, for melting, evaporating and severing the optical fiber at said irradiated portion, comprising the step of fixing the portion to be severed at, of the optical fiber, in a cylindrical capillary formed to be flat on the side to be irradiated with the laser beam.

2. A method of severing an optical fiber using a laser beam, in which a laser beam emitted from a laser beam source is applied through a square light transmitting section and a lens to an optical fiber, to form a square light spot on the irradiated portion, for melting, evaporating and severing the optical fiber at said irradiated portion, comprising the steps of obtaining beforehand and storing the corresponding relation between the first angle formed between the laser beam irradiation direction and a plane perpendicular to the axial direction of the optical fiber and the second angle formed between the severed end face of the optical fiber and said plane, with a laser beam irradiation condition as a parameter; obtaining the first angle for a desired second angle based on said corresponding relation at a desired laser beam irradiation condition; supporting the optical fiber in such a manner as to achieve the obtained first angle; and carrying out said severing.

3. A method of severing an optical fiber using a laser beam, according to claim 2, wherein cases of the corresponding relation under respective laser beam irradiation conditions are stored as a functional formula.

4. A method of severing an optical fiber using a laser beam, according to claim 2, wherein cases of the corresponding relation under respective laser beam irradiation conditions are stored as a table.

* * * * *